United States Patent [19]

Easterwood

[11] Patent Number: 5,410,893
[45] Date of Patent: May 2, 1995

[54] LOCKPIN HITCH LOCK

[76] Inventor: Doris E. Easterwood, 2517 Stagestand, Duncan, Okla. 73533

[21] Appl. No.: 142,566

[22] Filed: Oct. 28, 1993

[51] Int. Cl.[6] .................... B60D 1/60; B60R 25/00
[52] U.S. Cl. ................................. 70/14; 70/34; 70/56; 70/232; 70/258; 280/507; 292/148
[58] Field of Search ................ 70/14, 54–58, 70/33, 34, 232, 258; 280/504, 507; 292/148

[56] References Cited

U.S. PATENT DOCUMENTS

| Re. 28,187 | 10/1974 | Longenecker | 280/507 |
|---|---|---|---|
| 1,557,911 | 10/1925 | White | 70/232 |
| 2,856,220 | 10/1958 | Easley | 70/56 |
| 3,606,423 | 9/1971 | McCarthy | 292/148 |
| 3,740,978 | 6/1973 | Smith et al. | 70/55 X |
| 3,780,546 | 12/1973 | Longenecker | 70/58 |
| 3,808,847 | 5/1974 | Vesely | 70/56 X |
| 3,977,221 | 8/1976 | Foote | 70/58 |
| 4,291,557 | 9/1981 | Bulle et al. | 70/58 |
| 4,571,964 | 2/1986 | Bratzler | 280/507 X |
| 4,883,294 | 11/1989 | Goodspeed | 292/148 |
| 4,920,772 | 5/1990 | Denison | 70/56 X |
| 5,076,078 | 12/1991 | Weger, Jr. | 70/54 |

*Primary Examiner*—Lloyd A. Gall
*Attorney, Agent, or Firm*—Robert K. Rhea

[57] ABSTRACT

A trailer hitch coupling anti-theft lock is formed by a platen underlying the ball socket recess of a hitch coupling and having an elongated lock pin projecting vertically through the platen and secured at its innermost end with a flange for impinging a component of the hitch coupling between the flange and the platen. A hollow housing surrounding a shackle-type padlock is provided with an aperture in its wall for slidably receiving the outwardly projecting end portion of the lockpin and biasing the housing wall forming the aperture into an annular groove in the lockpin adjacent the outer surface of the platen in response to inward movement of the lock body relative to its shackle.

6 Claims, 3 Drawing Sheets

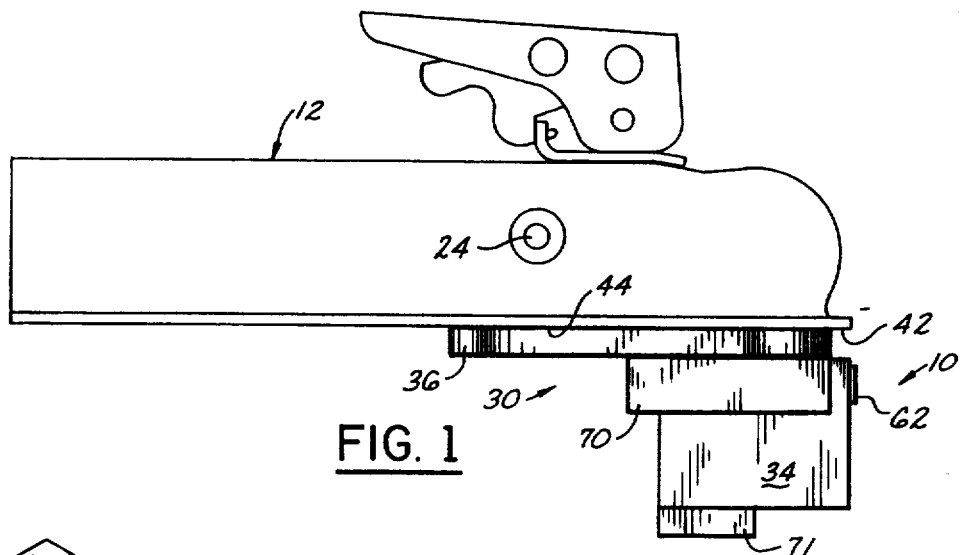
FIG. 1
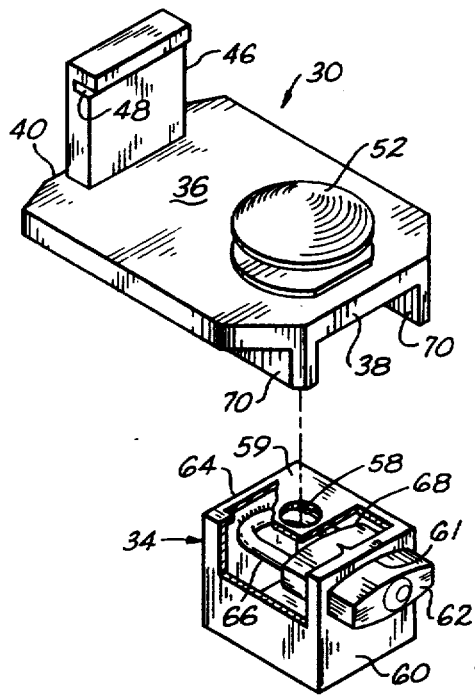
FIG. 2
FIG. 3
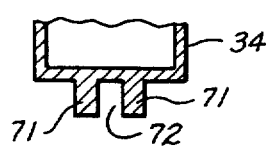
FIG. 4

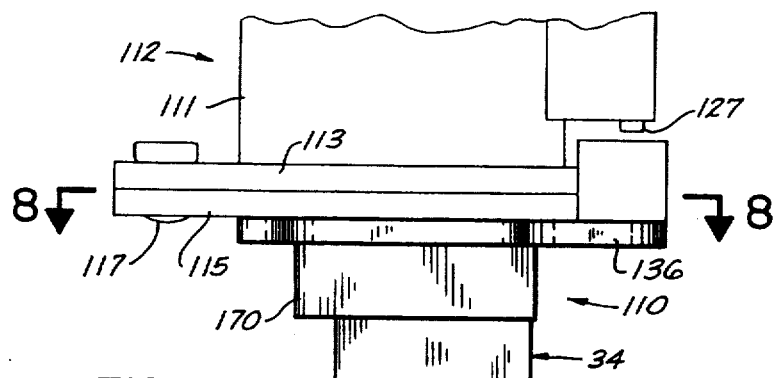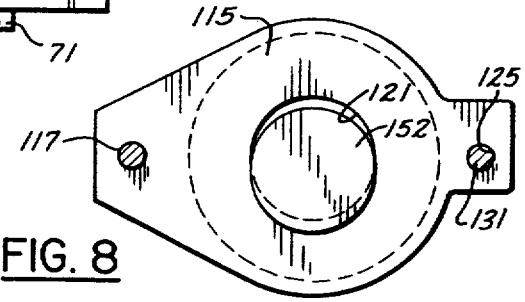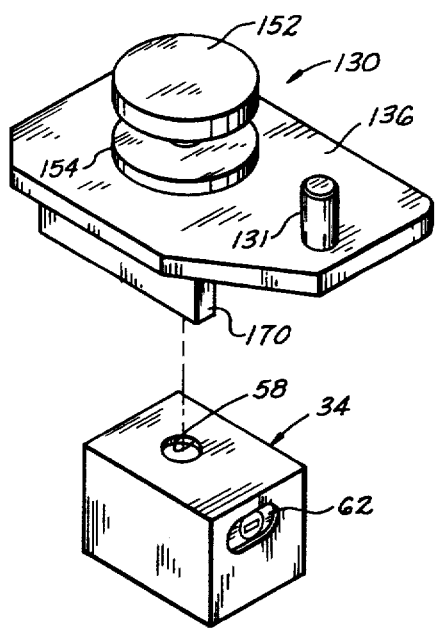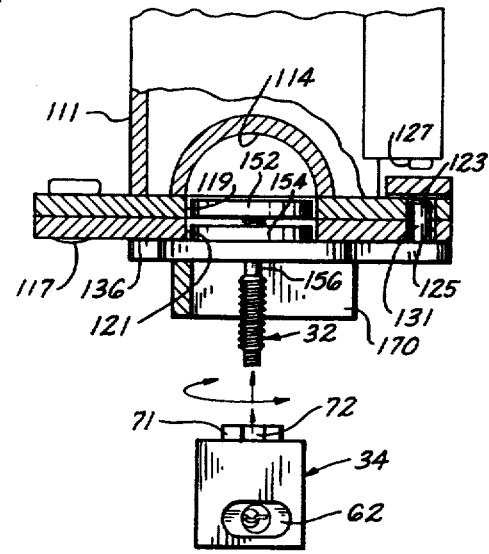

LOCKPIN HITCH LOCK

BACKGROUND OF THE INVENTION

This invention relates to automotive accessories and more particularly to an anti-theft lock and pin for a trailer tongue hitch.

1. Field of the Invention

Trailer tongue hitches usually provide a toggle link lever which in operative position grips the hitch ball of a towing trailer and may be padlocked in the toggle lever closed position.

Similarly, the toggle lever may be locked in closed position when the trailer has been disconnected from its towing vehicle in order to prevent theft of the trailer.

However, since the shackle of the padlock is exposed, an unauthorized person, by using a bolt cutter tool, may remove the padlock and tow away the entire trailer.

This invention provides a lockpin and shielded lock arrangement which partially enters the hitch ball receiving socket portion of a trailer hitch and is locked therein for securing a trailer.

2. Description of the Prior Art

U.S. Pat. No. 3,780,546 issued Dec. 25, 1973 to Longenecker for TRAILER HITCH LOCK generally discloses a member for closing the downwardly open socket formed by a hitch coupler for receiving a trailer hitch ball in which the member is provided with a U-shaped horizontal groove which nests the outwardly projecting U-shaped flange of the hitch coupler at its end portion opposite its trailer.

The socket closing member is provided with a recess receiving the body of a padlock in which the padlock shackle is modified by anchoring the notch locking leg of the shackle in the member so that the lock body engages the shackle leg when the lock body is disposed in locked position.

U.S. Pat. No. RE. 28,187 issued Oct. 1, 1974 to Longenecker for HITCH LOCK discloses another type of a hitch coupler locking mechanism comprising a modified trailer hitch ball which enters the socket forming portion of a hitch coupler with the ball being provided with a base having a recess therein for receiving the body of a padlock.

This padlock is similarly modified by removing the notch leg portion of its shackle and anchoring it in a base recess for locking with the lock body when it is pushed into the recess completely housing the lock body.

U.S. Pat. No. 3,977,221 issued Aug. 31, 1976 to Foote for TAMPER PROOF SET SCREW ASSEMBLAGE FOR LOCKING DEVICES and U.S. Pat. No. 4,291,557 issued Sep. 29, 1981 to Bulle et al for TRAILER HITCH LOCK generally show the state-of-the-art in which locking devices for a trailer hitch coupler similarly provides a horizontal groove enveloping the horizontal flange surrounding the ball hitch socket portion of a hitch coupler and in which a prong of the locking mechanism engages an inner surface of the ball receiving socket and is held in place by a key lock inserted into the locking mechanism.

This invention is distinctive over the above named patents and similar patents by providing a lockpin threadedly extending through a hitch coupler ball socket closing member and having a flange on its inwardly projecting end engaging a surface of one member being secured.

A housing completely enclosing a shackle type key operated padlock receives the end portion of the lockpin opposite its flange and biases the wall of an aperture in the lock shielding housing into an annular groove in the lockpin to prevent removal of the latter and releasing the lock member.

SUMMARY OF THE INVENTION

In one embodiment a lockpin is threadedly secured at one end portion to a base member closing the socket opening of a hitch coupler. The other inwardly projecting end of the lock-pin is axially attached to a flange member for frictionally engaging a surface of the socket forming member opposite the base member.

The shackle of a padlock is rigidly anchored to the inner wall surface of a hollow box heusing having an aperture in its wall opposite the lock shackle for sliding movement of the key operated end of the padlock body in the housing wall during locking and unlocking action of the padlock with its shackle.

An aperture in another wall of the housing, having its axis normal to the enclosure formed by the padlock shackle, slidably receives the end of the lockpin opposite its flange for biasing the wall forming the housing wall aperture into an annular groove intermediate the ends of the lockpin when the lock body is locked with its shackle.

The principal objects of this invention are to provide a security device for a trailer hitch or similar article which includes a minimum number of separable components and includes a key operated padlock having shackle protection to deter unauthorized removal of the padlock and does not engage or extend around the coupler of a trailer, thus, minimizing the possibility of a prying action in an attempt to remove the locking device.

BRIEF DESCRIPTION OF THE DRAWINGS

FIG. 1 is a side elevational view of one embodiment of a trailer hitch coupler illustrating the device in operative position;

FIG. 2 is an exploded perspective view of the locking components with a portion of the shackle shielding wall broken away for clarity;

FIG. 3 is a partially exploded side elevational view of the locking mechanism with the hitch coupler partially in section;

FIG. 4 is a fragmentary vertical cross sectional view, to a larger scale, taken substantially along the line 4—4 of FIG. 3;

FIG. 5 is a fragmentary side elevational view of another embodiment of the invention;

FIG. 6 is an exploded perspective view of the locking components of FIG. 5;

FIG. 7 is a side elevational view, to a smaller scale, of the components of FIG. 5 with the trailer hitch socket forming components in section;

FIG. 8 is a top view looking in the direction of the arrows 8—8 of FIG. 5; and,

DESCRIPTION OF THE PREFERRED EMBODIMENTS

Figure 9:
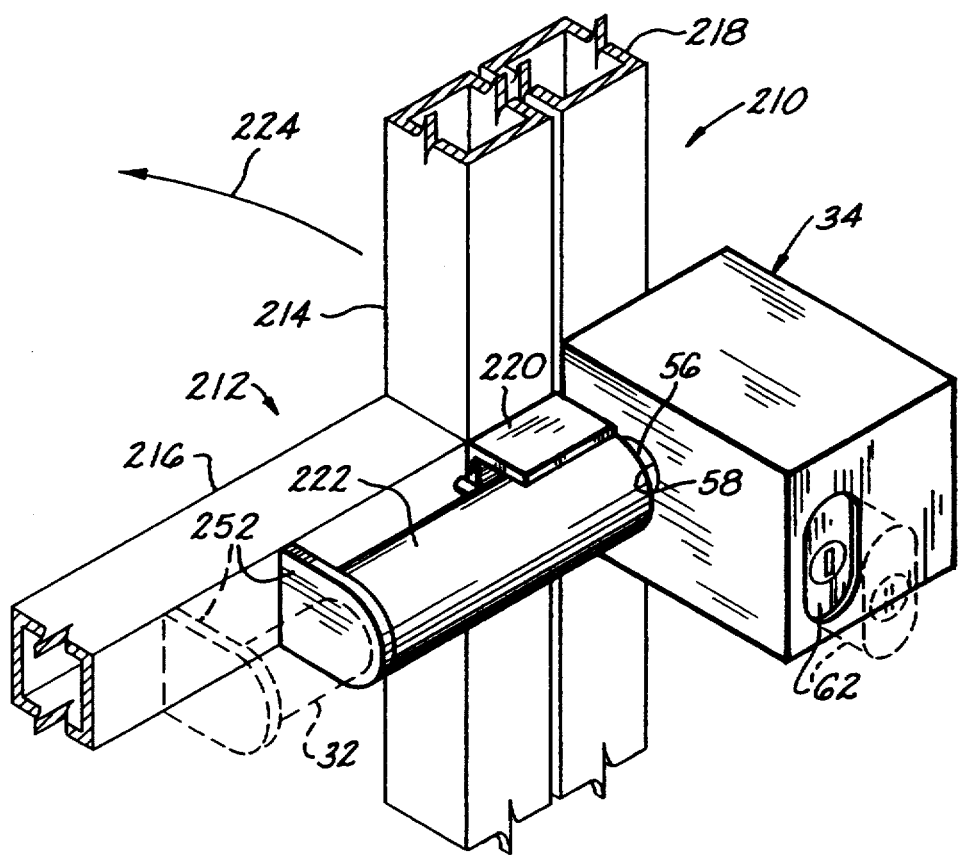
FIG. 9 is a fragmentary perspective view of another embodiment.

Like characters of reference designate like parts in those figures of the drawings in which they occur.

In the drawings:

Referring more particularly to FIGS. 1–4, the reference numeral 10 indicates a locking device for securing a trailer hitch coupling 12 when disconnected from a trailer hitch ball, not shown.

The coupling 12, at its forward end, forms a downwardly open socket 14 for receiving the ball of a trailer hitch assembly. The coupling 12 includes a toggle link shoe 16 having a partially concave forward edge surface normally engaging a trailer hitch ball when disposed in the socket 14.

The shoe is raised and lowered by the stem of a toggle link normally biased downwardly by a spring 20 and connected at its upper end with a toggle lever 22 which raises and lowers the forward end of the toggle link shoe 16 by pivoting its rearward end portion about a pin 24 extending transversely between the side walls of the coupler 12.

A toggle latch 26 engages a friction plate 28 interposed between the lever 22 and the housing of the coupler 12 to secure the toggle lever in locked position when the shoe 16 is engaged with a hitch ball.

The above description is conventional with many trailer hitch couplers and is set forth to show the combination with which the embodiment 10 may be used.

The locking device 10 principally comprises a base member 30 for closing the opening of the socket 14, a lockpin 32 for securing the base to the hitch coupler 12 and a lock housing 34 for shielding the outwardly projecting end portion of the lockpin.

The base 30 comprises a platen 36 having forward and rearward ends 38 and 40 dimensioned to underlie the coupler flange surface 42 at its forward end and extend rearwardly to a point beyond the position of the toggle shoe 16. Transversely, the platen underlies the flange surfaces 44 at respective sides of the coupler, thus, closing the socket 14.

The platen 36 is provided with a rearward upstanding leg 46 having a height substantially equal to the vertical inside dimension of the coupler. The forward inner end portion surface of the leg 46 is provided with a forwardly facing transverse groove 48 which nests the rearward end portion 50 of the toggle shoe to prevent downward movement of the platen 36, as by an unauthorized person trying to gain access to the coupler socket.

The lockpin 32 has a threaded exterior cooperatively received by a threaded aperture, not shown, in the platen 36. The inward end of the lockpin 32 is axially connected with a flange member 52 which may be conical in shape (FIGS. 2 and 3).

A washer-like disk 54 is interposed between the flange 52 and the adjacent surface of the platen 36 and is secured to the latter around the lockpin 32. The lockpin is further provided with an annular recess or groove 56 intermediate its ends for the purpose which will now be explained.

The lock housing 34 comprises a rectangular hollow box-like frame having an aperture 58 in one of its walls 59 which slidably receives the outward or depending end portion of the lockpin, as viewed in FIG. 3.

The housing wall 60, normal to the wall 59, is provided with an aperture 61 which slidable receives the body 62 of a conventional padlock. The inner surface of a wall 64, opposite the wall 60, is rigidly secured to the bight portion of the lock U-shaped shackle 66. The opening defined by the shackle 66 and the lock body inner end 68 cooperatively surrounds the depending end portion of the lockpin when inserted into the housing aperture 58.

The lock body is locked with its shackle by manually moving the lock body 62 into the housing 34. This locking action of the lock body with its shackle moves the inward end surface 68 of the lock body toward and into abutting relation with the lockpin 32 which moves the housing wall surface, forming its aperture 58, to an eccentric position with respect to the lockpin annular groove 56, thus, locking the housing 34 on the lockpin and preventing removal of the lock assembly from the hitch coupling 12.

The base member 30 is further provided with a pair of depending parallel walls 70 extending rearwardly from its forward end substantially one-half the length of the platen 36 and spaced apart a distance closely receiving the side walls of the lock housing 34 as a protective shield for preventing removal of the lock housing 34 as by the use of a sledge hammer or the like.

The lock housing 34 is similarly provided, on its depending surface opposite the position of the aperture 58, with walls forming a wrench socket 72 cooperatively receiving wrench flats 57 formed on the depending end of the lockpin 32 for the purpose presently explained.

In operation of the embodiment of FIGS. 1–4, the toggle link lever 32 is raised from its locked position of FIG. 1 to its released position of FIG. 3.

The base member and lockpin assembly 30 is positioned by manually tilting the platen 36, so that flange member 52 may be inserted into the coupling at the depending limit of its ball receiving socket 14 to substantially the position shown by FIG. 3 wherein the platen upper surface abuts the depending inwardly converging inner flange surfaces 42 and 44 of the coupling. While holding the base assembly 30 in this position, the lock housing 34 is inverted from its position in FIG. 3, so that its wrench socket 72 may engage the wrench flats 57.

By angularly rotating the lockpin 32, to move the flange member 52 downwardly as viewed in FIG. 3, the periphery of the flange engages the forward surface of the toggle shoe 16 and an inner adjacent surface of the coupling wall forming the ball socket 14 and anchors flange 52 in the socket 14 and disposes the lockpin groove below the lower surface plane of the platen 36. The lock and housing assembly 34 is then engaged with the lockpin as described hereinabove.

The washer-like member 54 is diametrically substantially equal with the spacing between the inner wall surfaces of the coupling member to preclude lateral movement of the plate relative to the coupling.

The trailer owner easily gains access to the ball socket 14 by reversing the above described assembly procedure wherein the padlock key releases the lock for removal of the lock housing 34 from the lockpin 32.

Referring now more particularly to FIGS. 5–8, the reference numeral 110 indicates another embodiment of the trailer hitch coupling locking mechanism.

Some trailers, commonly referred to as goose-neck trailers, feature a hitch coupling 112 which comprises a vertically disposed sleeve 111 having its depending end rigidly secured to a centrally apertured plate 113 having a ball receiving socket 114 within the sleeve.

The plate 113 is pivotally connected to a similar centrally apertured plate 115 by a pin 117. The central apertures of the plates 119 and 121 are mated and mismated by horizontal movement of the lower plate 115 about the axis of the pin 117 for securing or releasing a hitch ball, not shown, when disposed in the ball socket 114.

Opposite the pin 117, the plates 113 and 115 are respectively provided with smaller diameter mating and mismating apertures 123 and 125, which are mated when the plate central apertures 119 and 121, are mismated. A pin 127, slidably supported by the sleeve 111 is released to enter the mated openings 123 and 125 and secure the hitch ball in the socket 114.

The above description of the hitch coupling 112 is substantially conventional and is set forth to show the combination with which the locking mechanism 110 is used.

The locking mechanism 110 similarly comprises a base member 130, the lockpin 32 and padlock surrounding housing 34.

The base member 130 comprises a generally rectangular platen 136 having longitudinal and transverse dimensions substantially coextensive with the major portion of the depending surface of the pivoting plate 115. One end portion of the platen 136 is provided with an upstanding pin 131 diametrically dimensioned for entering the pin apertures 123 and 125, when mated, and having a length substantially equal to the combined thickness dimension of the hitch coupling plates 113 and 115 for the reasons presently explained.

The lockpin 32 is similarly axially connected at one end with a dish or flange 152 for engaging and gripping the hitch plate 113 as presently explained.

The flange end portion of the lockpin 32 is threadedly engaged with the platen 136 and a ring-like spacer 154 overlying the platen.

In the operation of the embodiment 112, the coupler plate 115 is manually positioned relative to the plate 113 so that the apertures 119, 121 are in coaxial alignment.

The platen 136 is manually positioned against the depending surface of the coupling plate 115 to dispose the flange 152 and spacer 154 within the mated apertures 119, 121 and the flange 152 spaced above the spacer 154 a selected distance. The coupler plate 115 is manually moved laterally in a direction to align the pin openings or apertures 123 and 125 to receive the pin 131. This positions the flange 152 eccentrically with respect to the plate 115 aperture 121.

The lock housing 34 is inverted to engage its wrench slot 72 with the lockpin flats 57 and threadedly advance the lockpin 32 in a downward direction, as viewed in FIG. 7, until the depending surface of the flange 152 is tightly engaged with the overlapped surface of the coupling plate 115, thus, impinging the plate 115 between the lockpin flange 152 and the platen 136.

The spacer 154 coaxially disposed in the aperture 121 prevents lateral movement of the lockpin and its flange relative to the axis of the coupler 112. The depending surface of the platen 136 is similarly provided with depending lock housing guide walls 170 for nesting opposing sides of the lock housing 34 when its aperture 58 cooperatively receives and locks with the depending end portion of the lockpin.

Referring now to FIG. 9, the reference numeral 210 indicates another embodiment of the lockpin 32 and lock housing assembly 34 for locking two members moveable relative to each other. In this embodiment the numeral 212 indicates a fragment of a horizontally swinging gate including a gatepost 214 having a horizontal arm or brace 216 connected therewith.

The gate 212 being closed when its post 214 is disposed adjacent a fence post 218.

A lockpin bracket 220 secures a horizontal open end sleeve 222 to the gate 212 for horizontal sliding movement of the lockpin 32 in the sleeve.

A flange 252 is connected to one end of the lockpin for frictionally engaging brace 216 for sliding movement of the lockpin toward and away from a position adjacent the fence post 218. When the lockpin is in its solid line position, of FIG. 9, the gate cannot be moved in the opening direction of the arrow 224 until the lockpin is moved to its dotted line position.

With the lockpin 32 in its solid line position, the lock housing assembly 34 may be engaged with the lockpin annular recess 56 by manually moving the lock housing 34 toward the lockpin, so that its aperture 58 slidably receives the protruding end of the lockpin. The lock body 62 is similarly locked with its shackle by manually sliding the lock body into the housing 34.

Release of the gate is accomplished by inserting a padlock key into the padlock body 62 key opening to release the shackle and move the lock housing off the end of the lockpin to be manually retracted to its dotted line position.

Obviously the invention is susceptible to changes or alterations without defeating its practicability. Therefore, I do not wish to be confined to the preferred embodiment shown in the drawings and described herein.

I claim:

1. A locking device for a trailer hitch coupling having an arcuate downwardly converging wall forming a downwardly open hitch ball receiving socket and having a toggle link shoe moveable at one end portion into and out of the socket, the locking device comprising:
    a platen for longitudinally underlying the coupling and closing the socket;
    a lockpin extending through said platen into the socket;
    a disk-like flange axially secured to the inward end of said lockpin for overlying an inner surface portion of said converging wall and an adjacent end portion of the shoe,
    said lockpin having an annular groove normally disposed adjacent the platen opposite the flange; and,
    a housing substantially surrounding a padlock and having an aperture in a first wall cooperatively receiving the end portion of said lockpin opposite the flange,
    said housing having a second wall rigidly secured to a shackle opposite a lock body of said padlock for eccentrically moving the wall surface forming the first wall aperture in the lockpin annular groove in response to shackle movement into the lock body.

2. The locking device according to claim 1 and further including:
    leg means on said platen opposite the lockpin flange for engaging the shoe for maintaining the platen in contact with the hitch coupling.

3. The locking device according to claim 2 and further including:
    wrench means on said housing for angularly rotating said lockpin about its longitudinal axis.

4. A locking device for a trailer hitch coupling having a downwardly open sleeve closed at its depending end by vertically apertured superposed plates,
    a lowermost plate being moveable relative to an uppermost plate for mating and mismating the apertures, the locking device comprising:
    a platen for underlying the lowermost plate;
    pin means on said platen for mismating the apertures;

a lockpin extending vertically through said platen;

a flange axially secured to an inwardly projecting end of said lockpin for overlying an edge portion of the lowermost plate for impinging said edge portion between the platen and the lockpin flange, said lockpin having an annular groove normally disposed adjacent a depending surface of the platen;

a padlock having a lock body and having a shackle moveable into and out of the lock body; and, a housing substantially surrounding said padlock and having an aperture in a first wall cooperatively receiving the end portion of said lockpin opposite the flange, said housing having a second wall rigidly secured to said shackle opposite the lock body for eccentrically moving the wall surface forming the first wall aperture in the lockpin annular groove in response to shackle movement into the lock body.

5. The locking device according to claim 4 and further including:

a spacer on said lockpin adjacent said platen for precluding lateral movement of the lockpin relative to axes of the mismated apertures.

6. A locking device, comprising:

a lockpin extending between adjacent separable members, said lockpin having a flange at one end frictionally engaging the surface of one said member opposite the other said member and having an annular groove intermediate its ends;

a padlock having a lock body and having a shackle moveable into and out of the lock body; and, a housing substantially surrounding said padlock and having an aperture in a first wall cooperatively receiving the end portion of said lockpin opposite the flange, said housing having a second wall rigidly secured to said shackle opposite the lock body for eccentrically moving the wall surface forming the first wall aperture in the lockpin annular groove in response to shackle movement into the lock body.

* * * * *